US00RE47331E

(19) United States
(12) Reissued Patent
Fenster et al.

(10) Patent Number: US RE47,331 E
(45) Date of Reissued Patent: Apr. 2, 2019

(54) STAIR EXERCISER APPARATUS

(71) Applicant: Johnson Health Tech Co., Ltd., Taichung (TW)

(72) Inventors: Mrako A. Fenster, Madison, WI (US); Derek L. Nelson, Lake Mills, WI (US); Chih-Ming Lai, Taichung (TW); Kung-Lung Lai, Taichung (TW); Chieh-Wen Lin, Taichung (TW); Ming-Hsin Chi, Taichung (TW); Chinh-Kuo Huang, Taichung (TW); Yung-Fa Wang, Taichung (TW)

(73) Assignee: Johnson Health Tech Co., Ltd., Taichung (TW)

(21) Appl. No.: 15/450,848

(22) Filed: Mar. 6, 2017

Related U.S. Patent Documents

Reissue of:
(64) Patent No.: 8,974,353
Issued: Mar. 10, 2015
Appl. No.: 14/201,232
Filed: Mar. 7, 2014

U.S. Applications:
(63) Continuation of application No. 13/086,368, filed on Apr. 13, 2011, now Pat. No. 8,702,571.

(51) Int. Cl.

| | |
|---|---|
| ***A63B 22/04*** | (2006.01) |
| ***A63B 21/005*** | (2006.01) |
| ***A63B 21/22*** | (2006.01) |
| ***A63B 71/06*** | (2006.01) |

(52) U.S. Cl.
CPC ..... *A63B 22/04* (2013.01); *A63B 21/0051* (2013.01); *A63B 21/225* (2013.01)

(58) Field of Classification Search
CPC ... A63B 22/04; A63B 21/0051; A63B 21/225; A63B 2071/0658; A63B 2071/0694; A63B 2220/13; A63B 2220/30; A63B 2230/06
USPC ..... 482/52, 5, 66, 54
See application file for complete search history.

(56) References Cited

U.S. PATENT DOCUMENTS

| | | | | |
|---|---|---|---|---|
| 481,565 | A * | 8/1892 | Hunt | 182/43 |
| 3,311,996 | A | 4/1967 | Bergener | |
| 3,497,215 | A | 2/1970 | Harrison et al. | |
| 3,592,466 | A | 7/1971 | Parsons | |
| 3,711,812 | A * | 1/1973 | Cherry | 338/200 |
| 4,687,195 | A | 8/1987 | Potts | |
| 4,726,581 | A | 2/1988 | Chang | |
| 4,927,136 | A * | 5/1990 | Leask | A63B 22/04 198/323 |
| 5,145,475 | A | 9/1992 | Cares | |

(Continued)

*Primary Examiner* — Beverly M Flanagan
(74) *Attorney, Agent, or Firm* — Smith Law Office; Jeffry W. Smith

(57) ABSTRACT

The present invention relates to a stair exercise device for simulating stair climbing, the device having a plurality of steps which are activated by the weight of a person walking up them. A stationary platform at the base of the stair exercise device sends a signal to a controller to bring the exercise device to a controlled stop when an operator steps onto the platform. The steps of the exercise device stop in a predetermined location when the exercise device comes to a controlled stop, ensuring proper step location to allow the operator to easily enter and exit the exercise device. Steps have a step platform of a different color than the risers between steps to aid in foot placement.

37 Claims, 7 Drawing Sheets

(56) References Cited

U.S. PATENT DOCUMENTS

| | | | | |
|---|---|---|---|---|
| 5,207,621 | A * | 5/1993 | Koch et al. | A63B 22/0056 482/112 |
| 5,328,420 | A | 7/1994 | Allen | |
| 5,556,352 | A | 9/1996 | Chang | A63B 22/04 482/51 |
| 5,769,759 | A | 6/1998 | Alter et al. | |
| 6,348,024 | B1 | 2/2002 | Hwang | |
| 6,622,715 | B2 | 9/2003 | Liu | |
| 7,101,317 | B2 | 9/2006 | Kuo | |
| 7,399,258 | B1 | 7/2008 | Sugar et al. | |
| 8,702,571 | B2 * | 4/2014 | Fenster et al. | 482/52 |

* cited by examiner

STAIR EXERCISER APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates to exercise equipment and more particularly to stair exerciser equipment for simulating stair climbing.

SUMMARY OF THE INVENTION

The present invention relates to a stair exerciser involving a downwardly and rearwardly sloping treadmill having a plurality of steps which are activated by the weight of a person "walking" up them.

The stair exerciser includes a frame shaped in the form of a staircase and having a base and necessary support structures. A plurality of movable hinged steps are supported from an inclined track located at each side of the frame extending from an portion of the frame to a lower position just above the base of the frame.

Two pairs of pillow blocks for rotatably supporting upper and lower shafts are secured to the frame below the inclined tracks. A sprocket is mounted on either end of each shaft. A pair of endless chains is supported around the sprockets which are mounted on the ends of the upper and lower shafts. The chains are sealed motorcycle chains designed to keep grit and dirt away from the greased pivot connecting each chain link to the next. A number of connecting links are placed at predetermined locations along each chain and are spaced equidistant from each other.

A series of steps are connected to the connecting links of the pair of endless chains, forming an endless chain conveyor. The steps are made up of normally horizontal tread platforms and normally vertical risers. The connection between the normally horizontal tread platforms and normally vertical risers and the connecting links allow the normally horizontal tread platforms and the normally vertical risers to travel around the sprockets with the endless chains. The tread platforms and riser portions fold to an acute angle when they traverse around a sprocket whereas they are normally at right angles along the straight portion of the chain between sprockets.

A transmission belt connects a first pulley on either the upper shaft or the lower shaft and a second pulley on a speed control mechanism. The speed control mechanism includes a flywheel which is driven by the second pulley on the speed control mechanism and a braking mechanism, such as an eddy current brake (ECB). The rotation of the flywheel is connected by way of the pulleys and transmission belts to cyclical movement of the endless chain conveyor around the upper and lower shafts. The braking mechanism resists the rotation of the flywheel. The braking mechanism is adjustable so that adjusting the amount of braking force performed by the ECB increases and decreases the resistance to the flywheel rotation based upon the setting of the braking mechanism. The braking mechanism is used to increase and decrease the resistance level of the stair exerciser, by controlling the amount of resistance applied to the motion of the endless chain conveyor.

The braking mechanism, in addition to slowing the motion of the endless chain conveyor, may be used to stop the motion of the steps. A locking mechanism is connected to either the upper shaft of the lower shaft. The locking mechanism is engaged to immobilize the endless chain conveyor of the stair exerciser. When the locking mechanism is engaged, an operator of the stair exerciser may step onto the endless chain conveyor or step off of the endless chain conveyor without causing motion of the endless chain conveyor. When the locking mechanism is disengaged, the endless chain conveyor is no longer immobilized and may rotate around the upper shaft and lower shaft, though the rotation is resisted by the braking mechanism.

A position sensor indicates one or more locations of the endless chain conveyor about the upper shaft and lower shaft. The position sensor sends out a position signal to a controller. The controller communicates with the sensor, the braking mechanism, and the locking mechanism. During a controlled stop, the motion of the endless chain conveyor is brought to a stop by the operation of the braking mechanism. The controller engages and disengages the braking mechanism to bring the motion of the endless chain conveyor to a controlled stop at a specific location, and the locking mechanism is engaged to immobilize the endless chain conveyor. The specific location at which the endless chain conveyor is immobilized is chosen to set the lowest tread platform at a position and orientation relative to the ground for ease of ingress and egress by the operator of the stair exerciser.

A console, mounted to the frame at a position above the upper shaft, provides operating, goal-setting, and other health related information.

It is an object of the present invention to provide a stair exercise device including a frame having a base resting on a substantially horizontal support surface, a pair of shafts rotatably mounted to the frame, the pair of shafts including a lower shaft located toward the rear of the apparatus and an upper shaft located above the lower shaft and toward the front of the apparatus, and a pair of chain assemblies configured to revolve about the pair of shafts to constitute an endless chain conveyor. An upper run of the endless chain conveyor is supported by the frame. A number of steps span the endless chain conveyor and are capable of moving cyclically as the steps follow the revolving endless chain conveyor. A braking mechanism in the stair exerciser adjusts and controls the resistance to rotation of at least one of the pair of shafts, and thereby adjusts and controls the downward running speed of the steps.

The stair exerciser also includes a sensor for determining the position of the steps along its cyclical movement, and a locking mechanism for preventing motion of the steps when the locking mechanism is engaged. The stair exercisers has a controller that communicates with the sensor, the locking mechanism, and the braking mechanism, so that the controller can adjust and control the braking mechanism to adjust the resistance of the apparatus. The controller also adjusts and controls the braking mechanism and the locking mechanism to bring the steps to a controlled stop in one or more predetermined locations, so that the controller can stop the steps in a configuration where there is a stair landing position near the lower shaft, positioned in height and orientation to enable easy ingress onto and egress from the stair exerciser.

It is another object of the present invention to provide a stair exercise device with a stationary platform near the base of the frame of the stair exercise device and a switch configured to detect a load applied to the stationary platform. The switch communicates with the controller, and the switch sends a load signal to the controller when a load is applied to the stationary platform. Upon receipt of the load signal from the switch, the controller engages the braking mechanism to bring the steps to a controlled in one or more predetermined locations, so that the controller can stop the steps in a configuration where there is a stair landing position near the lower shaft, positioned in height and orientation to enable easy ingress onto and egress from the stair exerciser.

It is another object of the present invention to provide a stair exercise device with steps that are made up of a typically horizontal step platform that is a first color, and a typically vertical riser that is a different, second color. The color of the step platform is visually differentiated from color of the riser, making it easier for an operator to see where to step.

DETAILED DESCRIPTION

Figure 1:
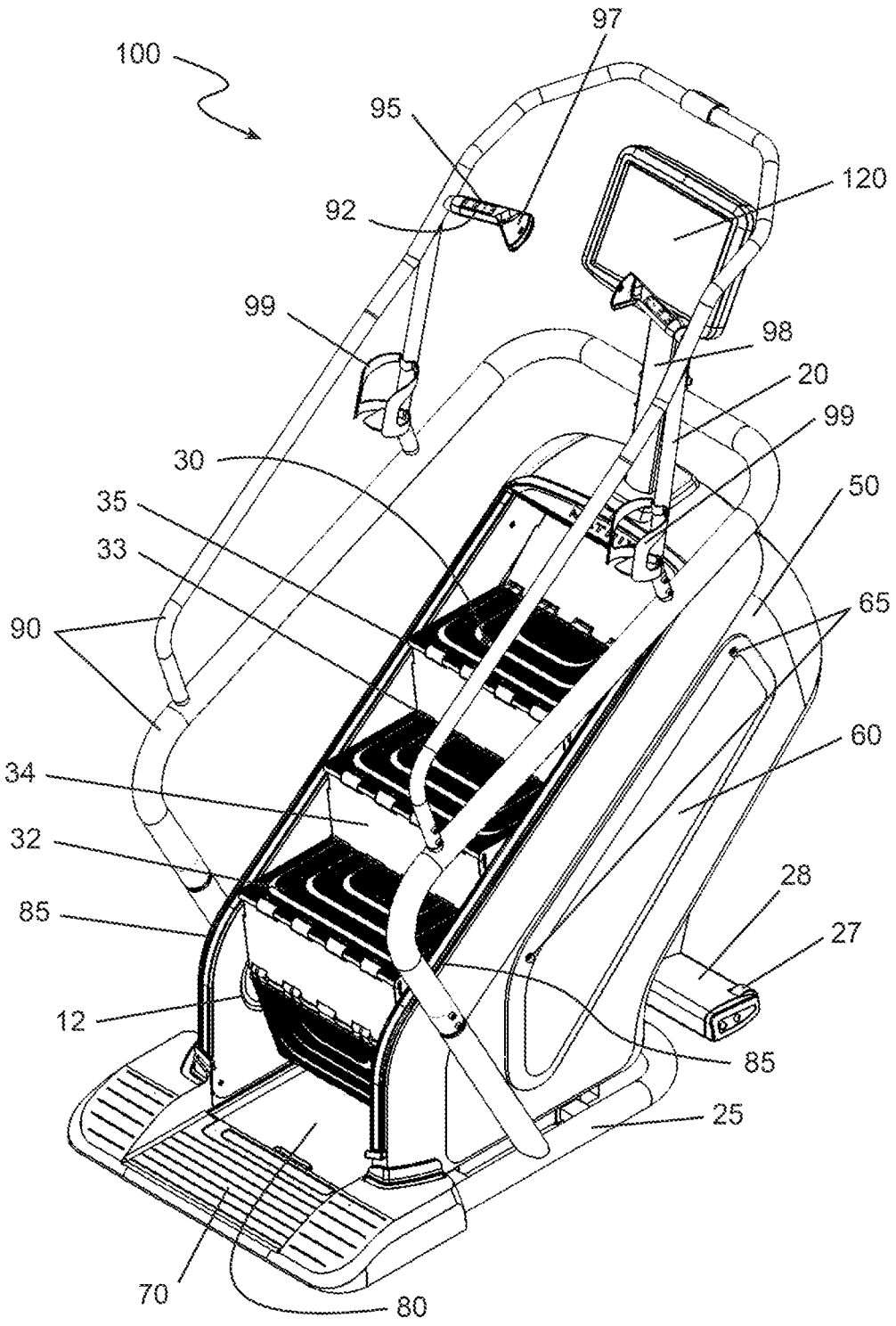
FIG. 1 is a perspective view of a stair exerciser constructed in accordance with the present invention.

Referring now to FIG. 1, a preferred embodiment of a stair type exercising device 100 is illustrated having a stationary frame 20 and a plurality of steps 30 supported by the frame 20 and able to move with respect to the frame 20. The steps 30 are pivotally 1 inked together and are attached to a pair of chain assemblies, forming an endless chain conveyor 12. The steps 30 are configured to move in a downward and backward direction as the endless chain conveyor 12 revolves in a cyclical fashion about an upper shaft 18 (shown in FIGS. 3-4) and a lower shaft 15 (shown in FIGS. 3-4).

The stair exerciser 100 includes a housing 50, removable access panels 60 covering access hatch openings in the housing 50, a hand rail 90, and couple of handlebars 92. Each handlebar 92 has contact heart rate pulse sensor 95 built into the handlebar 92. In addition, each handlebar 92 has control buttons 97 incorporated into the handlebar 92. The control buttons 97 on the handlebar 92 can include controls such as speed control, resistance control, start, stop, and pause. The frame 20 includes a base 25 and a mast 98. The mast 98 supports a console 120 with a display screen enabled to provide feedback to an operator. The console 120 may also include input devices to enable an operator to provide information to the stair exerciser 100.

Each of the steps 30 consists of a step platform 32 and a step riser 34. The step platforms 32 and step risers 34 are connected to each other by hinge pins so that each step 30 is pivotally connected to the next step 30, and the steps 30 each have pivots between step platform 32 and the step riser 34. The steps 30 are connected at the bottom of a step riser 34 by connecting pins 33, and the step platforms 32 and step risers 34 are connected to each other at the top of a step riser 34 by guide pins 35. The plurality of steps 30 are formed by alternating a step platform 32, a connecting pin 33, a step riser 34, a guide pin 35, and back to another step platform 32. The connecting pins 33 are connected to the endless chain conveyor 12.

The step platform 32 is a first color. The color could be molded into a plastic part, or the step platform 32 could be painted, or coated with colored material to make the step platform the first color. The first color might be a dark color like black to hide scuff marks on the step platform 32, and to easily identify the step platform 32. The step riser 34 is a second color, different from the first color. The second color would be a color that is easily distinguished from the first color, so in the case where the first color is black, the second color would be a lighter color, such as a light gray. The easily distinguishable colors assist an operator to visually identify each step platform 32 and to plant a foot firmly situated on the step platform 32 without kicking the step riser 34. To aid in foot placement, the step platform 32 is approximately 10 inches deep to ensure that there is enough surface area to locate most if not all of the foot on the surface of the step platform 32. The step riser 34 is approximately 9 inches tall so that each step up to the next step platform 32 is a reasonable distance, similar to steps in a building.

The stair exerciser 100 is illustrated with a stationary platform 70 located below and behind the steps 30 at the entrance to the stair exerciser 100. The stationary platform 70 provides a convenient platform for an operator to stand upon before stepping onto a step 30 of the stair exerciser 100 to start exercising. Similarly, the stationary platform 70 provides a convenient surface upon which an operator can step when exiting the stair exerciser 100. The stationary platform 70 is connected to a switch 75 (shown in FIG. 6), which may be configured to generate a load signal 76 to indicate when a load such as the weight of an operator is upon the stationary platform 70.

A removable debris tray 80 is illustrated below the steps 30, adjacent to the stationary platform 70. As the steps 30 revolve along with the endless chain conveyor 12, dust, dirt and debris is transported along with the steps 30 until the steps 30 revolve down and around the lower shaft 15. As the steps 30 revolve around and underneath the lower shaft 15, the dust, dirt and debris drop from the steps 30 and are captured by the debris tray 80. The debris tray 80 may be removed to dispose of the captured debris, whereupon the clean debris tray 80 is returned to the stair exerciser 100 for further use. In addition to capturing dry debris, the debris tray is configured to also capture liquids. The housing 50 includes channels 85 configured to direct perspiration or other liquids spilled onto the housing 50 to flow down the channel 85 toward the debris tray 80.

FIG. 1 also illustrates a number of other features. Cup holders 99 are shown mounted to the hand rail 90. The base 25 includes a metal tube wrapping around the periphery of the stair exerciser 100 to protect the housing 50 from being accidentally kicked. The base 25 also includes a front support 28, and the front support 28 includes a transport wheel 27 on either side of the front support 28 to assist in moving the stair exerciser 100. There are a pair of locking and leveling casters 170 (shown in FIGS. 3-4) located underneath the stationary platform 70 that also assist in moving the stair exerciser 100.

Figure 2:
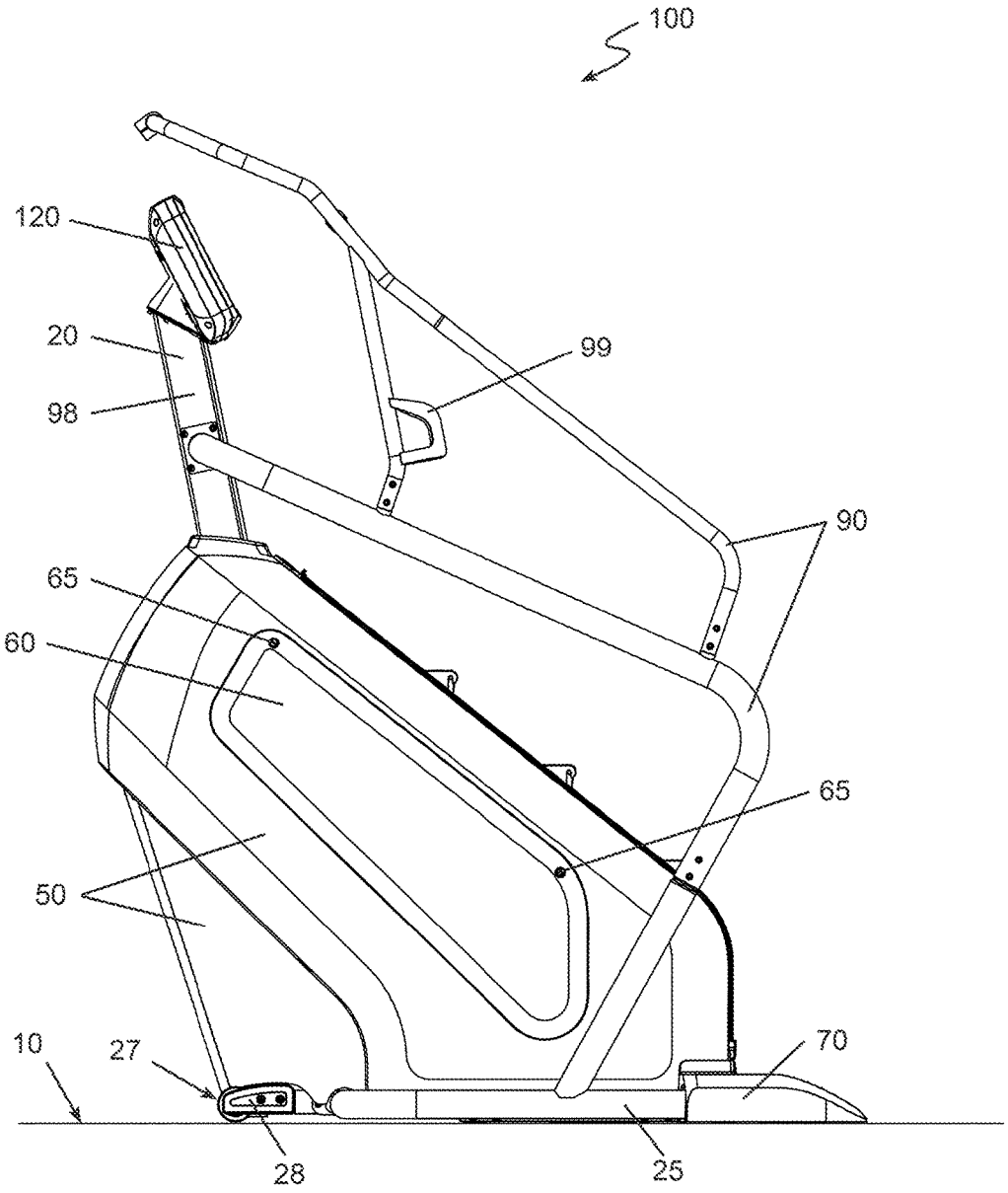
FIG. 2 is a left side elevation of the stair exerciser of FIG. 1.

Referring now to FIG. 2, a side view of the stair exerciser 100 shows the stair exerciser 100 resting on a support surface 10, such as a floor. The stair exerciser 100 has a housing 50 with a second removable access panel 60 on the left side of the stair exerciser 100. The front support 28 is shown with the previously unseen transport wheel 27 on the left side of the stair exerciser 100. The transport wheels 27 aid in the transport of the entire stair exerciser 100 from one location to another.

Figure 3:
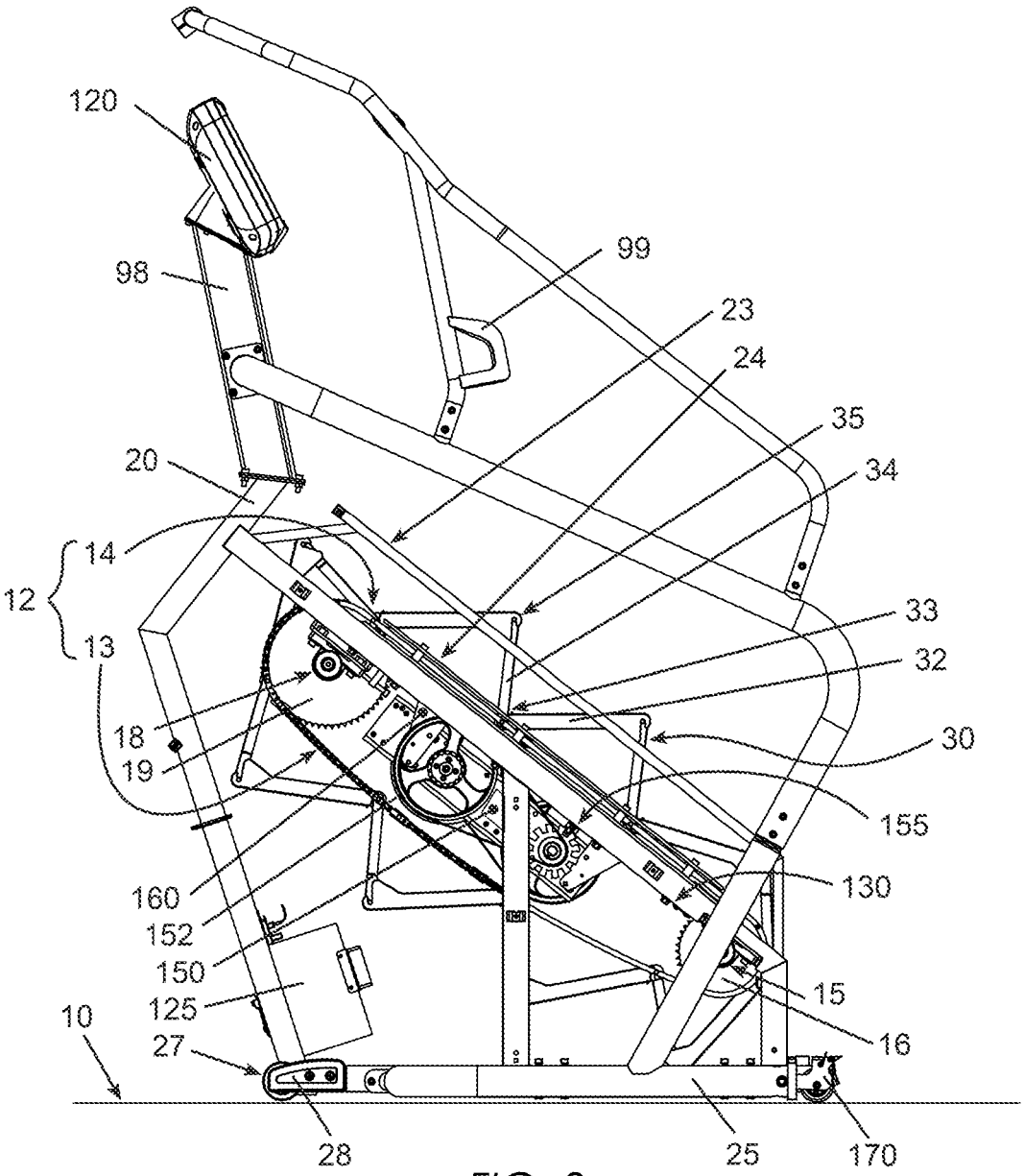
FIG. 3 is a left side elevation of the stair exerciser of FIG. 1 with the housing removed, showing the frame and other internal components.

Referring to FIG. 3, the stair exerciser 100 is illustrated with the covers removed to reveal internal features. The frame 20 is shown more clearly. The frame 20 includes the base 25, a front support 28, the mast 98, an inclined track 24 for supporting the endless chain conveyor 12 and the connecting pins 33 of the steps 30, and a guide rail 23 for supporting the guide pins 35 of the steps 30. A lower shaft 15 and an upper shaft 18 are rotatably mounted to the frame 20. The lower shaft 15 is connected to a pair of lower sprockets 16, and the upper shaft 18 is connected to a pair of upper sprockets 19. The endless chain conveyor 12 and the steps 30 are illustrated to be revolvably mounted about lower shaft 15 and the upper shaft 18.

The endless chain conveyor 12 is shown to have an upper run 14 configured to position a number of steps 30 for exercise use, and a lower run 13 configured to be a return path for the endless chain conveyor 12. The inclined track 24 supports and guides the connecting pins 33 and the upper run 14 of the endless chain conveyor 12 as the steps 30 move downward and backward along the inclined track 24. Because the inclined track 24 supports the connecting pins 33 and the connecting pins 33 are connected to the bottom of a step riser 34, the inclined track 24 positions the bottom of each step riser 34 as it travels along the upper run 14 of endless chain conveyor 12. The guide rail 23 supports and guides the guide pins 35 as the steps 30 move downward and backward along the inclined track 24. Because the guide rail 23 supports the guide pins 35 and the guide pins 35 are connected to the top of a step riser 34, the guide rail 23 positions the top of each step riser 34 as it travels along the upper run 14 of endless chain conveyor 12.

FIG. 3 also illustrates a microprocessor or controller 125 configured to receive electrical input signals from various sources such as a tachometer 155, a position sensor 130, a load switch 75, or a console 120. The controller 125 is configured to output various control signals to other devices such as a braking mechanism 150 or a locking mechanism 160. The controller 125 is shown as a separate unit mounted to the frame 20, but one skilled in the art will understand that the controller 125 could be located elsewhere such as embedded inside of the console 120.

A tachometer 155 is shown mounted onto the frame 20. The tachometer 155 measures the speed of the moving steps 30 and provides a speed signal to the controller 125. A position sensor 130 is shown mounted onto the frame 20.

The position sensor 130 provides position information 131 to the controller 125, where the position information 131 informs the controller 125 of the relative position of the steps 30 along the cyclical path followed by the steps 30 and the endless chain conveyor 12.

A braking mechanism 150 is shown mounted onto the frame 20 next to a flywheel 152. The braking mechanism 150 is controlled by control signals sent by the controller 125. The braking mechanism 150 is adjustable so that the amount of braking force may be increased or decreased by the controller 125. The flywheel 152 is connected by belts and pulleys to the upper shaft 18, though the flywheel could easily be connected instead to the lower shaft 15. As the steps 30 of the stair exerciser 100 are driven downward by an external load, such as the weight of an operator standing upon one or more of the steps 30, the endless chain conveyor 12 revolves about the upper shaft 18 and the lower shaft 15, causing the upper shaft 18 to rotate. The rotation of the upper shaft 18 drives the rotation of the flywheel 152. As the flywheel 152 rotates, the braking mechanism 150 provides an opposing torque to the flywheel 152, thereby slowing down the rotation of the flywheel 152 and the speed of the steps 30. The braking mechanism 150 may be an eddy current brake (ECB), a friction brake, or any other brake that is known in the art.

A locking mechanism 160 (not shown) is coupled to the upper shaft 18. The locking mechanism 160 is configured to prevent the upper shaft 18 from rotating and to prevent the steps 30 from moving when the locking mechanism 160 is engaged. When the steps 30 are stationary, the locking mechanism 160 is engaged by the controller 125 to ensure the steps 30 remain stationary. An operator stepping onto the steps 30 or stepping from the steps 30 down to the stationary platform 70 will find the process much easier when the steps 30 are locked in a stationary position.

The steps 30 may also be brought to a controlled stop when the steps 30 are moving. The controller 125 first engages the braking mechanism 150 to slow or stop the motion of the steps 30. The controller 125 uses the position information 131 from the position sensor 130 to slow the motion of the steps 30 when the steps 30 are near a predetermined stopping position along the cyclical path followed by the steps 30 and the endless chain conveyor 12. The controller 125 further engages the braking mechanism 150 to fully stop the motion of the steps 30 when the steps 30 are located at the predetermined stopping position along the cyclical path. The controller 125 then engages the locking mechanism 160 to prevent additional movement of the steps 30. The controller 125 is able to consistently bring the steps 30 to the same predetermined stopping position any time the controller 125 stops the steps 30 of the stair exerciser 100.

Figure 4:
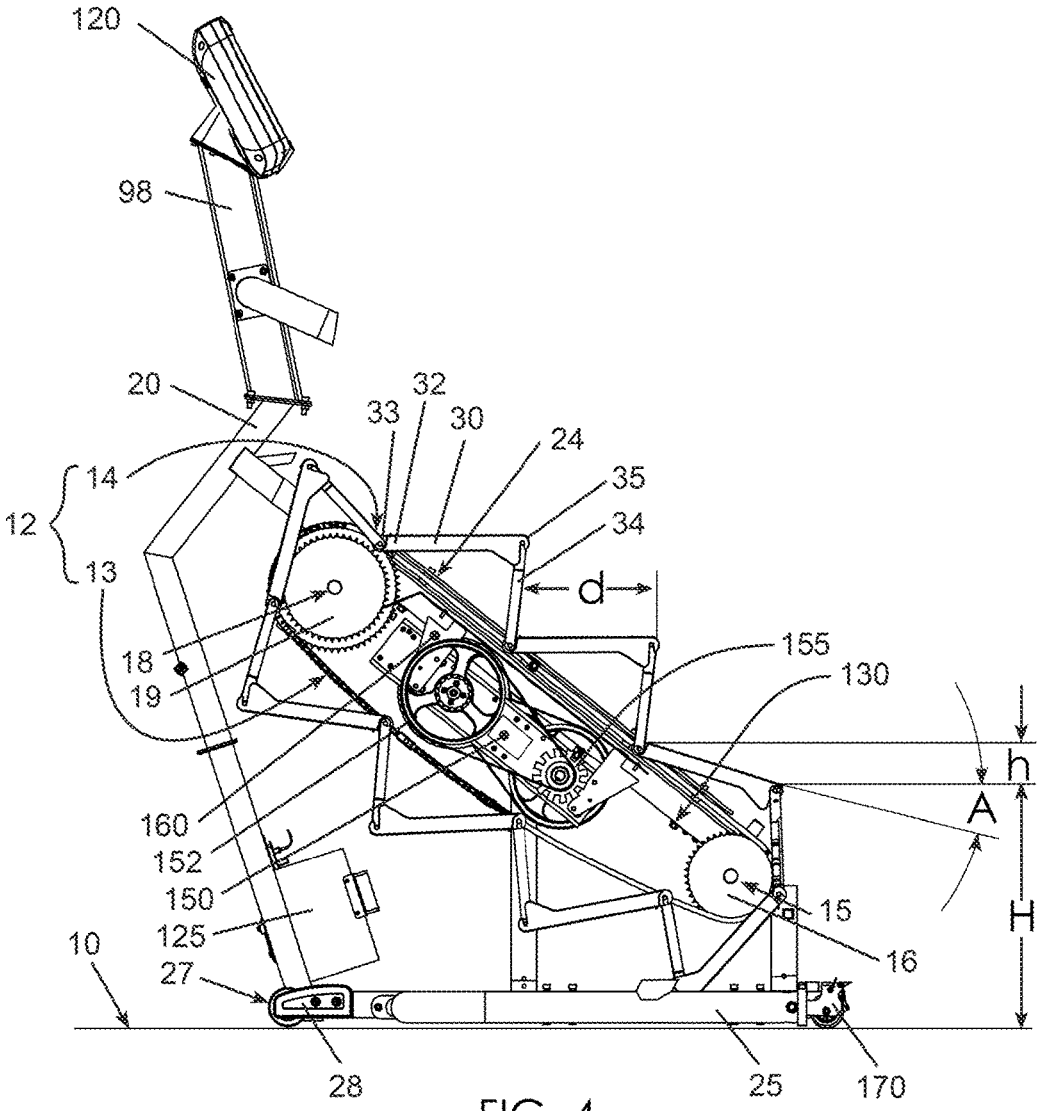
FIG. 4 is cut-away view of the left side elevation of FIG. 3, showing steps and the endless chain conveyor.
Figure 8:
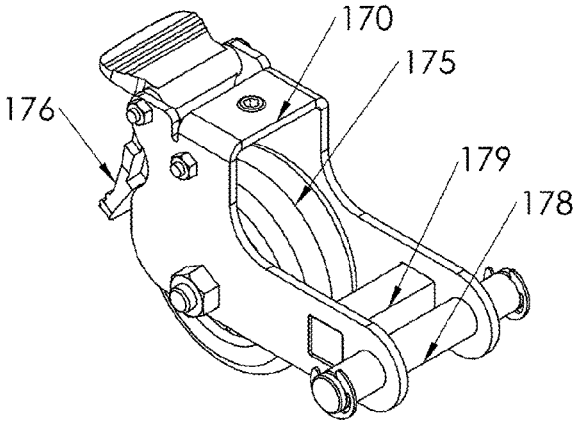
FIG. 8 is a perspective view of a caster from the stair exerciser of FIG. 3.
Figure 9:
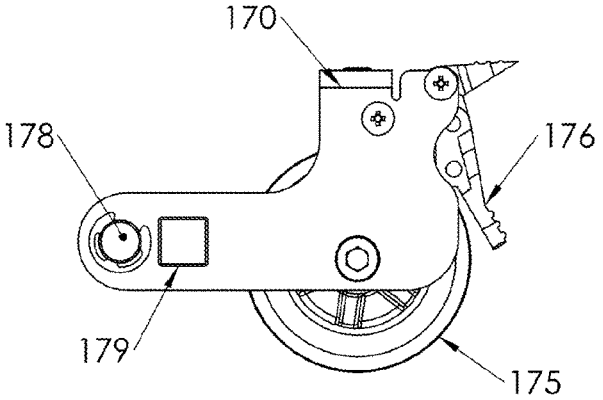
FIG. 9 is a left side elevation of the caster shown in FIG. 8.
Figure 10:
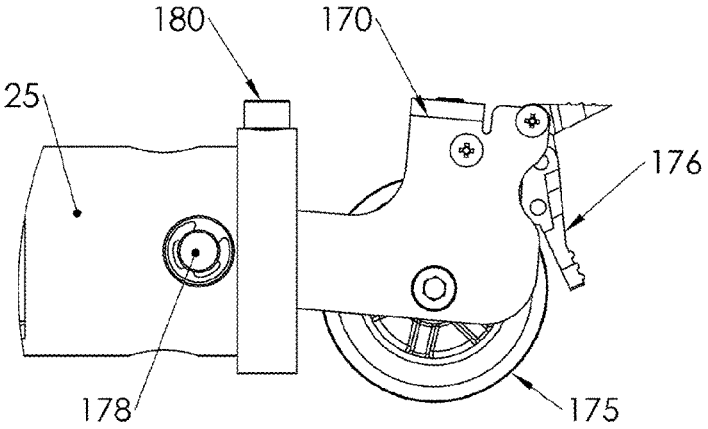
FIG. 10 is a close-up view of the caster from the stair exerciser of FIG. 3 showing the leveling feature of the caster.

Referring now to FIGS. 3-4, a caster 170 is located near the back end of the stair exerciser 100. The caster 170 serves much the same purpose as the transport wheel 27 located on the front support 28. The casters 170 and the transport wheels 27 allow the stair exerciser 100 to be rolled from one location to another location. The casters 170 will be discussed in greater detail when FIGS. 8-10 are discussed.

Referring now to FIG. 4, the lowest step platform 32 on the upper run 14 of the endless chain conveyor 12 is shown at an angle (A) relative to a horizontal line. The step riser 34 supporting the rear portion of the step platform 32 has begun to wrap around the lower sprocket 16 on the lower shaft 15, causing the rear portion of the step platform 32 to drop below the elevation of the front portion of the step platform 32. The elevation of the rear portion of the step platform 32 is at an elevation H relative to the support surface 10. The elevation of the front portion of the step platform 32 is at an elevation (H+h) relative to the support surface 10. This difference in elevation (h) between the front portion and rear portion of the step platform 32 orients the step platform in a plane that is at an angle (A) relative to a horizontal plane.

If the depth of the step platform 32 is a constant depth (d), then the angle (A) of the step platform 32 is:

$$\mathrm{Tan}(A)=(h/d)$$

Or $$(A)=\mathrm{Arctan}\ (h/d)$$

It is beneficial to an operator of the stair exerciser 100 to minimize the step-up height of the stair exerciser 100. That is, a lower step-up height makes it easier for an operator to mount the lowest step 30 of the stair exerciser 100 from the stationary platform 70, and a lower step-up height make it easier for an operator to dismount from the lowest step 30 of the stair exerciser 100 to the stationary platform 70. One way to lower the step-up height (H) is to increase the difference in elevation (h) between the front portion and rear portion of the step platform 32. A lower front portion of the step platform 32 means a lower step-up height (H). However, increasing the difference in elevation (h) between the front portion and rear portion of the step platform 32 also increases the angle (A) of the orientation of the step platform 32. Therefore, care must be taken to choose a predetermined stopping location for the steps 30 such that the step-up height (H) is low for the convenient entering and exiting of the stair exerciser 100, while keeping the angle (A) of the orientation of the step platform 32 low enough to ensure that an operator will not slip off the of the step platform 32.

The angle (A) for the lowest step platform 32 may be 0 degrees from the horizontal plane, or 5 degrees, 10 degrees, 15 degrees, 17.5 degrees, 20 degrees, 25 degrees, or 30 degrees. A step platform 32 at any of these angles (0-30 degrees from the horizontal plane) provides a surface that may easily be stood upon.

The step-up height (H) for the lowest step platform 32 may be 0 inches above the support surface 10 or ground, or it may be 5 inches, 10 inches, 12 inches, 13 inches, 14 inches, or 15 inches above the support surface 10. A step platform 32 at any of these step-up heights 10 or elevations (0-15 inches above the support surface) provides a reasonable step-up height from the support surface 10.

The controller 125 has the ability to bring the steps 30 to a controlled stop at any position along the cyclical path followed by the steps 30 and the endless chain conveyor 12. In the preferred embodiment, the controller 125 is configured to bring the steps 30 to a predetermined controlled stop location that will position the lowest step platform 32 having a relatively low elevation or step-up height (H) of approximately 13 inches above the support surface 10, and having a relatively low orientation angle (A) of approximately 17.5 degrees from a horizontal plane.

Figure 5:
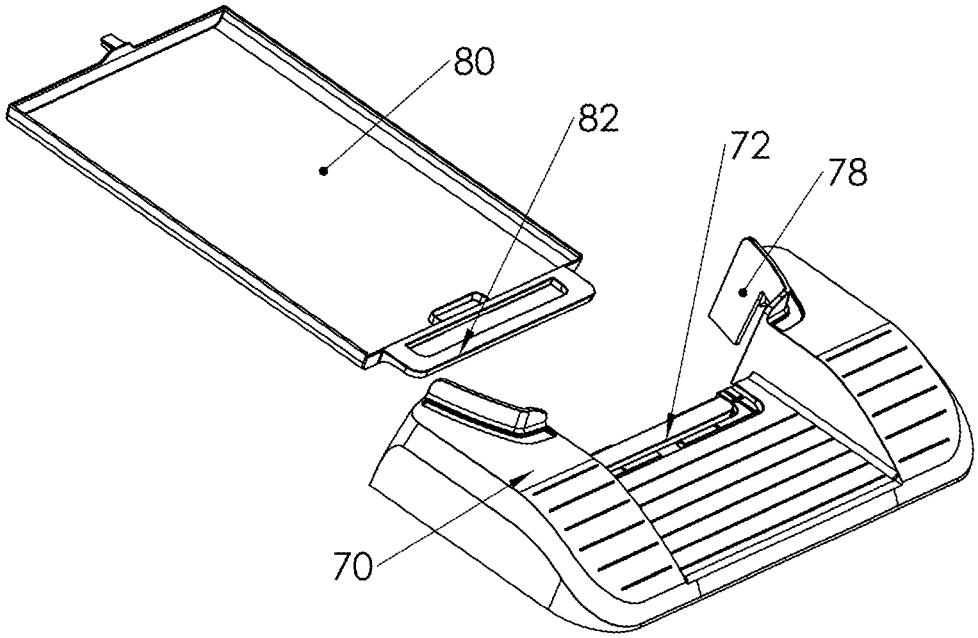
FIG. 5 is a perspective view of a removable tray and a stationary platform from the stair exerciser of FIG. 1.

Referring now to FIG. 5, a close-up view of the removable debris tray 80 and the stationary platform 70 are shown. The stationary platform 70 has hook features 78 to connect the stationary platform 70 to the frame 20. The stationary platform 70 also has a mating feature 72 to connect to a loop 82 on the debris tray 80. By connecting the debris tray 80 to the stationary platform 70, and by connecting the stationary platform 70 to the frame 20, the stationary platform 70 and the debris tray 80 become an integral part of the stair exerciser 100, and move with the stair exerciser 100 as a single unit.

Figure 6:
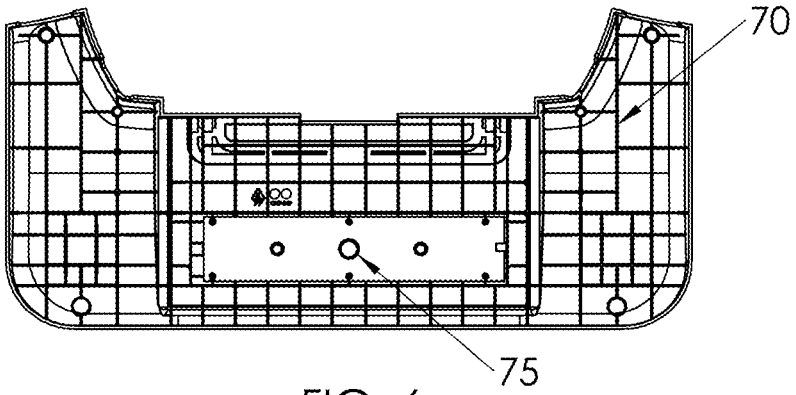
FIG. 6 is a bottom view of the stationary platform of FIG. 5.

In FIG. 6, the underside of the stationary platform 70 has a load switch 75 for sending a load signal 76 to the controller 125. The load switch 75 detects when an operator is standing on the stationary platform 70, and sends the load signal 76 to the controller 125. The controller 125 then brings the steps 30 to a controlled stop if the steps 30 are moving, and the controller 125 engages the locking mechanism 160 to prevent any further motion of the steps 30. The operator may then easily step up onto the steps 30 of the stair exerciser 100 while the steps 30 are locked into a stationary position.

Figure 7:
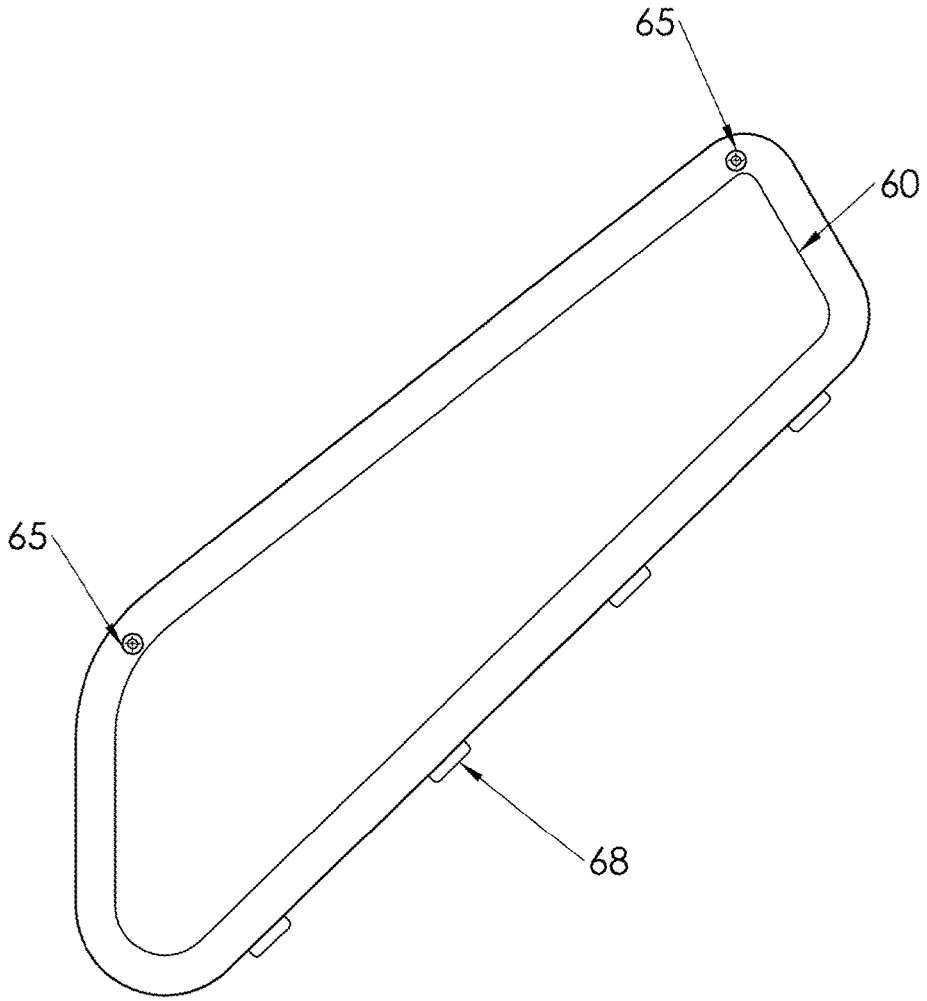
FIG. 7 is a view of an access panel from the stair exerciser of FIG. 1.

Referring now to FIG. 7, the removable access panel 60 is shown. The access panel 60 has locking tabs 68 along one side that may be snapped into an access hatch opening in the housing 50 to quickly attach the one side of the access panel 60 to the housing 50. The access panel 60 as shown also has two quick locking fasteners 65 that can be screwed into the housing 50. The quick locking fasteners 65 are configured to remain attached to the access panel 60 at all times, so the quick locking fasteners 65 will not fall out and get lost like a typical screw fastener. The quick locking fasteners 65 shown only require a quarter-turn of the quick locking fastener 65 to connect the access panel 60 to the housing 50. By using a combination of snap-fit locking tabs 68 to attach one side of the access panel 60 and a limited number of quick locking fasteners 65 to retain the other side of the access panel 60, the removable access panel 60 may be removed from access hatch opening in a matter of seconds, and just as quickly replaced, thereby aiding any maintenance work that may need to be performed within the housing.

Referring now to FIGS. 8-10, the casters 170 have a caster wheel 175 much like the transport wheel 27 (shown in FIGS. 3-4). However, the casters 170 also have a wheel lock 176 to prevent rotation of the caster wheel 175. By locking the wheel lock 176, the stair exerciser 100 is held in a stationary position, and by unlocking the wheel lock 176, the stair exerciser 100 is able to be rolled about on the two caster wheels 175 and two transport wheels 27 for relocation of the stair exerciser 100.

FIG. 10 shows the caster 170 pivotally connected to the base 25. The caster 170 is configured to be raised and lowered relative to the base 25, allowing the caster 170 to be used to level the stair exerciser 100. A bearing plate 179 is mounted to the caster 170 at a distance from a pivot axle 178. The pivot axle 178 pivotally connects the caster 170 to the base 25, such that the caster 170 may pivot up or down about the pivot axle 178. A height adjustment screw 180 is screwed into a hole in the top of the base 25 and is driven down until it contacts the bearing plate 179 of the caster 170. The height adjustment screw 180 prevents the caster 170 from pivoting up any higher than the point at which the bearing plate 179 contacts the height adjustment screw 180. By adjusting the position of the height adjustment screw 180 in the base 25, the caster 170 can be lowered relative to the base 25 so that all four wheels (the two transport wheels 27, and the two caster wheels 175) are all in contact with the support surface 10. When all four wheels are in firm contact with the support surface 10, the stair exerciser 100 is properly leveled.

Whereas the present invention has been described in relation to the drawings attached hereto, it should be understood that other and further modifications, apart from those shown or suggested herein, may be made within the spirit and scope of this invention.

What is claimed is:

1. A stair exerciser apparatus for simulating stair climbing, comprising:

a frame having a base*, a front portion, and a rear portion for* resting on a substantially horizontal support surface;

a [pair of shafts rotatably mounted to the frame, the pair of shafts including a] lower shaft [located toward the] *rotatably mounted on the frame* rear [of the apparatus] *portion* and an upper shaft [located] *rotatably mounted*

*on the frame* above *and forward of* the lower shaft [and toward the front of the apparatus];

a [pair of chain assemblies synchronously revolvably disposed about the pair of shafts to constitute an endless chain conveyor, at least an upper run of the endless chain conveyor supported by the frame] *conveyor operatively engaged with the upper shaft and the lower shaft*;

a plurality of steps [disposed across the endless chain] *joined to the* conveyor [and capable of moving cyclically following the revolving endless chain] *for movement with the* conveyor, [wherein along the upper run of the endless chain conveyor,] each of the plurality of steps [are] *is* made up of a [substantially horizontal] step platform and a [substantially vertical] riser *pivotably joined to the step platform*, wherein each step platform is not less than [8] *8.3* inches deep and not greater than [12] *11.8* inches deep, and wherein a step proximate to the lower shaft is brought to a stop at a predetermined location as the step platform is partially rotated about the lower shaft such that the distance between the substantially horizontal support surface and the lowest portion of the step platform is between 12 inches and 14 inches;

a braking mechanism [to adjust and control the resistance to rotation of at least one of the pair of shafts, and thereby to adjust and control the downwardly running speed of the steps] *operatively engaged with the conveyor*;

a locking mechanism [for preventing motion of the plurality of steps when the locking mechanism is engaged, the locking mechanism being engaged when the motion of the plurality of steps is fully stopped by the braking mechanism] *operatively engaged with the conveyor*;

a *step position* sensor [for determining the position] *disposed to sense a position* of at least one of the plurality of steps [along its cyclical movement] *and to generate step position data*; and a controller [communicatively engaged with] *for receiving the step position data from* the *step position* sensor, *communicatively engaged with* the locking mechanism[,] and the braking mechanism, *whereby* the controller [adjusting] *adjusts* and [controlling] *controls* the braking mechanism for adjusting the resistance of the apparatus, *and* the controller [also adjusting] *adjusts* and [controlling] *controls* the braking mechanism and the locking mechanism for [bringing the plurality of steps to a controlled stop] *stopping at least one step* in [one of the one or more] *a* predetermined [locations, thereby to provide a] stair landing position proximate the lower shaft [that enables easy] *to enable* ingress onto and egress from the apparatus *at a fixed stair location*.

2. The apparatus of claim 1, wherein each step platform is not less than [10] *9.8* inches deep and not greater than [11] *11.0* inches deep.

3. The apparatus of claim 1, wherein each step riser is not less than [7] *7.1* inches high and not greater than [10] *9.8* inches high.

4. The apparatus of claim 1, wherein each step riser is not less than 7.5 inches high and not greater than 9 inches high.

5. The apparatus of claim 1, further comprising a pair of handlebars, each handlebar having a contact heart rate pulse sensor built into the handlebar.

6. The apparatus of claim 1, further comprising a pair of handlebars, each handlebar having a contact heart rate pulse sensor built into the handlebar, and having [at least one] *a* handlebar having a control to adjust the downwardly running speed of the steps.

7. The apparatus of claim 1, further comprising [at least one] *a* handlebar, the [at least one] handlebar having a control to adjust the downwardly running speed of the steps.

8. The apparatus of claim 1, further comprising [at least one] *a* handlebar, the [at least one] handlebar having a control to bring to a stop the motion of the steps.

9. A stair exerciser apparatus for simulating stair climbing, comprising:

a frame having a base resting on a substantially horizontal support surface;

a pair of shafts rotatably mounted to the frame, the pair of shafts including a lower shaft located toward the rear of the apparatus and an upper shaft located above the lower shaft and toward the front of the apparatus;

a pair of chain assemblies synchronously revolvably disposed about the pair of shafts to constitute an endless chain conveyor, at least an upper run of the endless chain conveyor supported by the frame;

a plurality of steps disposed across the endless chain conveyor and capable of moving cyclically following the revolving endless chain conveyor, wherein along the upper run of the endless chain conveyor, each of the plurality of steps are made up of a substantially horizontal step platform and a substantially vertical riser;

a braking mechanism to adjust and control the resistance to rotation of at least one of the pair of shafts, and thereby to adjust and control the downwardly running speed of the steps;

a locking mechanism for preventing motion of the plurality of steps when the locking mechanism is engaged, the locking mechanism being engaged when the motion of the plurality of steps is fully stopped by the braking mechanism;

a handlebar having a control to adjust the downwardly running speed of the steps and a control to bring to a stop the motion of the steps;

a sensor for determining the position of at least one of the plurality of steps along its cyclical movement; and a controller communicatively engaged with the sensor, the locking mechanism, the braking mechanism, and the handlebar controls, the controller adjusting and controlling the braking mechanism for adjusting the resistance of the apparatus, the controller also adjusting and controlling the braking mechanism and the locking mechanism for bringing the plurality of steps to a controlled stop in one of one or more predetermined locations, thereby to provide a stair landing position proximate the lower shaft that enables easy ingress onto and egress from the apparatus.

*10. The apparatus of claim 9, wherein each step platform is not less than 8.3 inches deep and not greater than 11.8 inches deep.*

*11. The apparatus of claim 9, wherein each step riser is not less than 7.1 inches high and not greater than 9.8 inches high.*

*12. The apparatus of claim 9, wherein each step riser is not less than 7.5 inches high and not greater than 9 inches high.*

*13. The apparatus of claim 9, wherein the handlebar includes a contact heart rate pulse sensor.*

*14. The apparatus of claim 9, and further comprising:*

*a second handlebar, and the second handlebar includes a contact heart rate pulse sensor, and includes a control to adjust the downwardly running speed of the steps.*

*15. The apparatus of claim 9, and further comprising:*

*a second handlebar, and the second handlebar includes a control to adjust the downwardly running speed of the steps.*

*16. The apparatus of claim 9, and further comprising:*

*a second handlebar, and the second handlebar includes a control to bring to a stop the motion of the steps.*

*17. The apparatus of claim 9, wherein at least one chain assembly is meshed with the upper shaft.*

*18. The apparatus of claim 9, wherein the upper shaft comprises:*

*a sprocket meshed with the endless chain conveyer.*

*19. The apparatus of claim 9, wherein the braking mechanism operatively engages the endless chain conveyor to variably resist movement of the endless chain conveyor.*

*20. The apparatus of claim 9, and further comprising:*

*a flywheel rotatably mounted on the frame and operatively engaged with the endless chain conveyer and the braking mechanism.*

*21. The apparatus of claim 9, and further comprising:*

*a flywheel rotatably mounted on the frame and operatively engaged with the upper shaft and the braking mechanism.*

*22. The apparatus of claim 9, and further comprising:*

*a guide rail joined to the frame; and*

*a guide pin joined to one of the steps, and slidably engaged with the guide rail.*

*23. The apparatus of claim 9, and further comprising:*

*a flow channel joined to the frame.*

*24. The apparatus of claim 9, and further comprising:*

*a stationary platform joined to the frame.*

*25. The apparatus of claim 9, and further comprising:*

*a stationary platform joined to the frame base.*

*26. The apparatus of claim 9, and further comprising:*

*a stationary platform joined to the frame; and*

*a load sensing switch connected to the stationary platform and in communication with the controller to selectively engage the locking mechanism.*

*27. The apparatus of claim 1, wherein each step platform is not less than 8 inches deep and not greater than 12 inches deep.*

*28. The apparatus of claim 1, wherein the conveyor comprises:*

*a first chain assembly; and*

*a second chain assembly, and each chain assembly is operatively engaged with the upper shaft and the lower shaft.*

*29. The apparatus of claim 1, wherein the conveyor comprises:*

*a chain conveyer.*

*30. The apparatus of claim 1, wherein the braking mechanism operatively engages the conveyor to variably resist movement of the conveyor.*

*31. The apparatus of claim 1, and further comprising:*

*a flywheel rotatably mounted on the frame and operatively engaged with the conveyer and the braking mechanism.*

*32. The apparatus of claim 1, and further comprising:*

*a flywheel rotatably mounted on the frame and operatively engaged with the upper shaft and the braking mechanism.*

*33. The apparatus of claim 1, and further comprising:*

*a guide rail joined to the frame; and*

*a guide pin joined to one of the steps, and slidably engaged with the guide rail.*

*34. The apparatus of claim 1, and further comprising:*

*a flow channel joined to the frame.*

*35. The apparatus of claim 1, and further comprising:*

*a stationary platform joined to the frame.*

*36. The apparatus of claim 1, and further comprising:*

*a stationary platform joined to the frame base.*

*37. The apparatus of claim 1, and further comprising:*

*a stationary platform joined to the frame; and*

*a load sensing switch connected to the stationary platform and in communication with the controller to selectively engage the locking mechanism.*

* * * * *